(12) United States Patent
Wallace et al.

(10) Patent No.: US 8,027,165 B2
(45) Date of Patent: Sep. 27, 2011

(54) PORTABLE MEMORY DEVICES WITH REMOVABLE CAPS THAT EFFECT OPERATION OF THE DEVICES WHEN ATTACHED

(75) Inventors: Robert F. Wallace, Sunnyvale, CA (US); Edwin J. Cuellar, San Jose, CA (US); Eliyahou Harari, Saratoga, CA (US); Yoram Cedar, Cupertino, CA (US)

(73) Assignee: Sandisk Technologies Inc., Plano, TX (US)

( * ) Notice: Subject to any disclaimer, the term of this patent is extended or adjusted under 35 U.S.C. 154(b) by 1916 days.

(21) Appl. No.: 10/888,599

(22) Filed: Jul. 8, 2004

(65) Prior Publication Data

US 2006/0026348 A1 Feb. 2, 2006

(51) Int. Cl.
*H05K 1/14* (2006.01)
(52) U.S. Cl. ....... 361/737; 174/260; 439/353; 439/76.1; 439/133; 439/140
(58) Field of Classification Search .................. 361/737; 711/115; 439/353, 76.1, 133, 140; 174/260
See application file for complete search history.

(56) References Cited

U.S. PATENT DOCUMENTS

| 5,930,729 | A  | * | 7/1999 | Khamis et al. ................. 455/571 |
| 6,266,724 | B1 |   | 7/2001 | Harari et al. |
| 6,561,421 | B1 | * | 5/2003 | Yu ................................. 235/451 |
| 6,612,853 | B2 | * | 9/2003 | Wu ................................ 439/136 |
| 2003/0161193 | A1 | | 8/2003 | Moran et al. |
| 2004/0078505 | A1 | | 4/2004 | Yu et al. |
| 2004/0252560 | A1 | | 12/2004 | Hsieh |

FOREIGN PATENT DOCUMENTS

| DE | 20208316 | | 9/2002 |
| EP | 0735505 | A2 | 10/1996 |
| EP | 0891047 | A2 | 1/1999 |
| EP | 1001348 | A2 | 5/2000 |
| EP | 1 769 427 | B1 | 6/2008 |
| JP | 2002-063782 | | 2/2002 |
| JP | 3099627 | | 4/2004 |
| KR | 2003080625 | A | 10/2003 |

(Continued)

OTHER PUBLICATIONS

Compaq et al., Universal Serial Bus Specification, revision 2.0, Apr. 27, 2000, pp. i-xxvii, 1-24 and 85-117.

(Continued)

*Primary Examiner* — Kambiz Zand
*Assistant Examiner* — Abiy Getachew
(74) *Attorney, Agent, or Firm* — Davis Wright Tremaine LLP

(57) ABSTRACT

A flash memory card structure with an external contact structure according to a published standard, such as the USB standard, also includes a second data transmission path, such as a wireless one. A removable cap fits over the card to cover the external contacts when they are not being used as a memory data path. One of two or more different caps may be selected to be placed on the card in order to control operation of the second data transmission path, such as to select the distance of wireless transmission from one of two or more pre-set distances. Power to operate the memory card through the second path, when not connected to a host, may also be provided through the external contacts by including a battery in the caps.

40 Claims, 6 Drawing Sheets

FOREIGN PATENT DOCUMENTS

| WO | 02/19266 A2 | 3/2002 |
|---|---|---|
| WO | WO 2006/014538 A1 | 2/2006 |

OTHER PUBLICATIONS

"IEEE Standard for a High Performance Serial Bus", document No. IEEE 1394-1995, pp. 1-81, 259-260, 336-341, as amended by document Nos. IEEE 1394a-2000 pp. 1-2 and 24, and IEEE 1394b-2002, pp. 1-2, 35-75.

"SanDisk Launches Cruzer USB Flash Drives and Cruzer Micro MP3 Companion Player in China, Taiwan and Hong Kong", http://www.sandisk.com/pressrelease/20040407.html, Apr. 9, 2004, 4 pages.

"SanDisk Cruzer USB Flash Drives", http://www.sandisk.com/pdf/retail/Cruzer_Family_Brochure_English.pdf, Jan. 20, 2004, 2 pages.

"Pretec i-Disk USB WLAN Adaptor+256MB Memory", http://www.expansys-usa.com/product.asp?code=110985, downloaded Jun. 23, 2004, 3 pages.

"Connect™ CompactFlash® Wi-Fi Card", http://www.sandisk.com/retail/c-cf-wifi.asp, downloaded Jun. 23, 2004, 1 page.

Notification of Transmittal of the International Search Report and the Written Opinion of the International Searching Authority, or the Declaration, International Application No. PCT/US2005/024087, 9 pages.

EPO, "Examiner's Report," corresponding in European Patent Application No. 05 772 312.4 on Jun. 5, 2007, 2 pages.

SIPO, Office Action mailed in related Chinese Patent Application No. 200580027033.4 on Jun. 2, 2009, 12 pages, including English translation.

SIPO, Office Action mailed in related Chinese Patent Application No. 200580027033.4 on Nov. 9, 2009, 6 pages, with allowed claims.

Notification of Reasons for Refusal for Japanese Patent Application No. 2007-520496 dated Jun. 7, 2011, 4 pages.

Listing of Claims for Japanese Patent Application No. 2007-520496 filed Jul. 6, 2005, 7 pages.

* cited by examiner

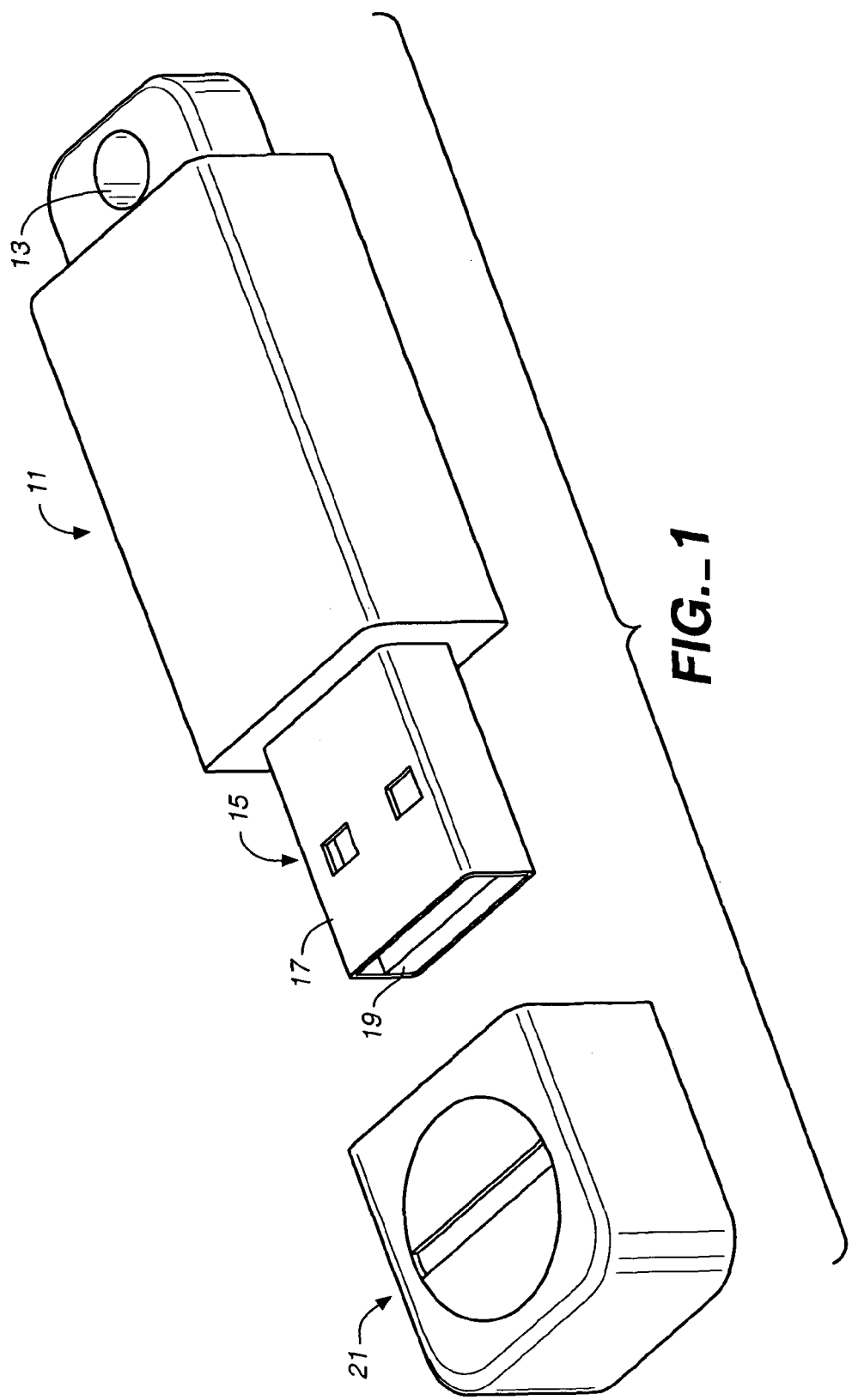
FIG._1

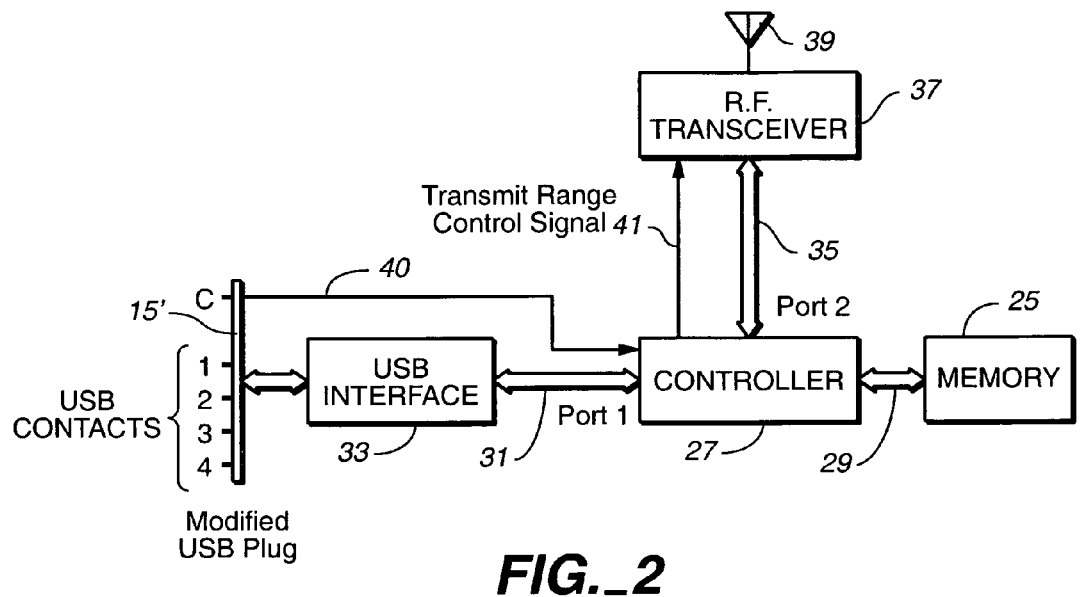
FIG._2
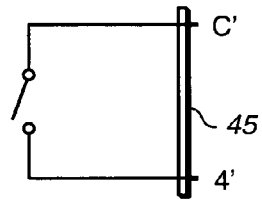
FIG._3A
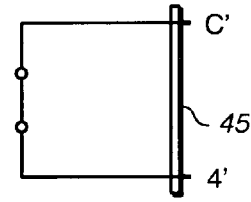
FIG._3B
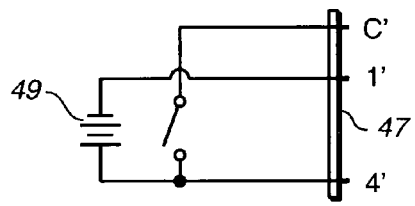
FIG._4A
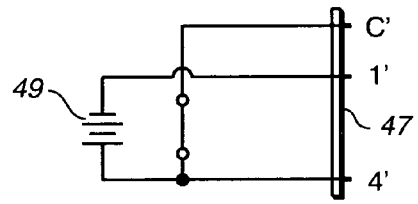
FIG._4B

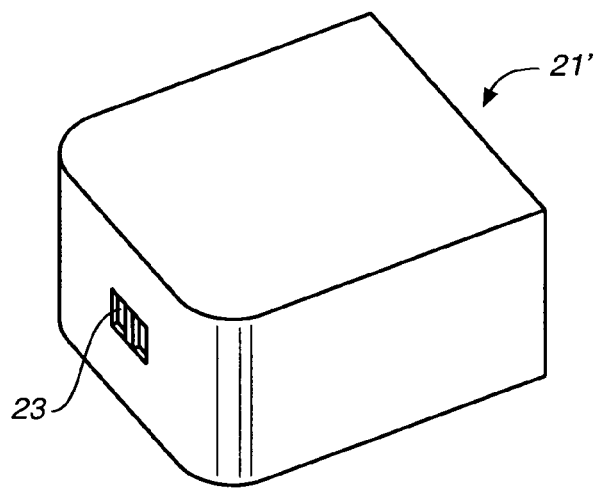
FIG._5
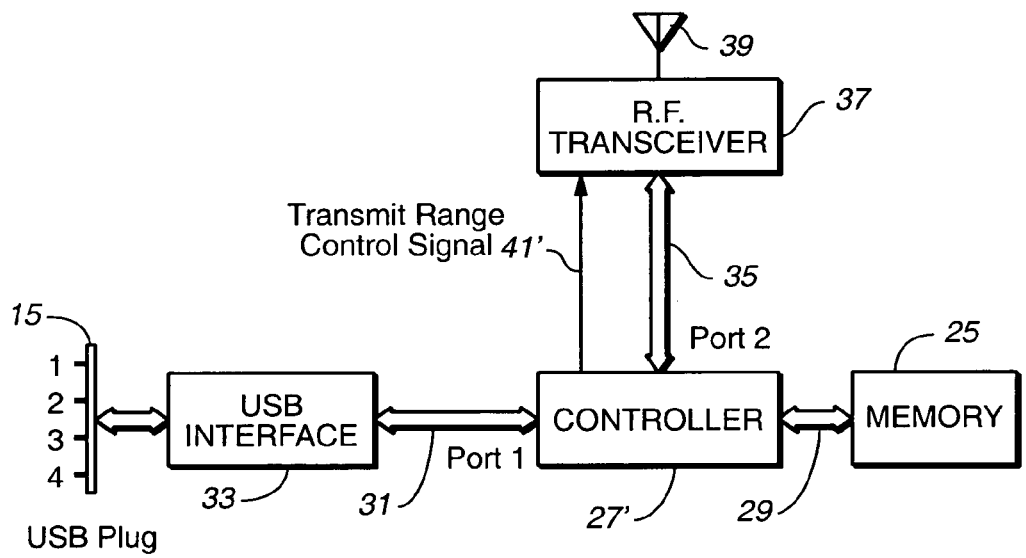
FIG._6
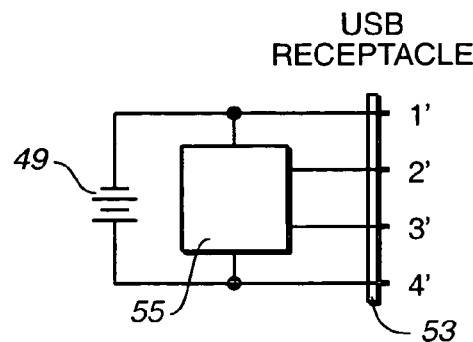
FIG._7

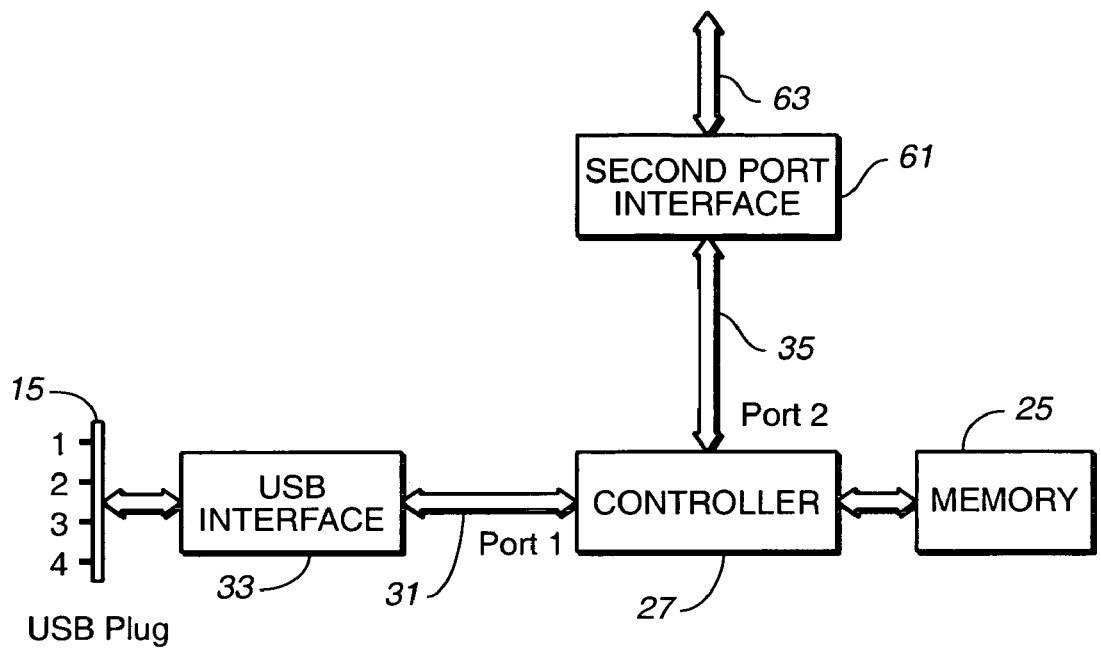
FIG._8
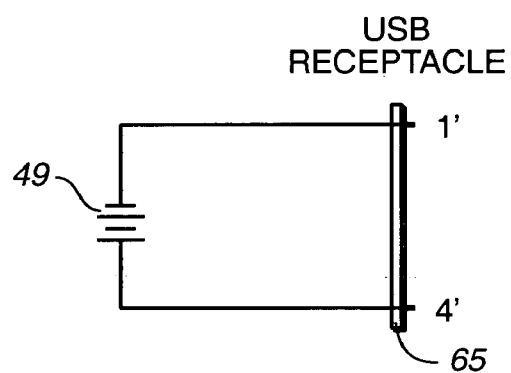
FIG._9

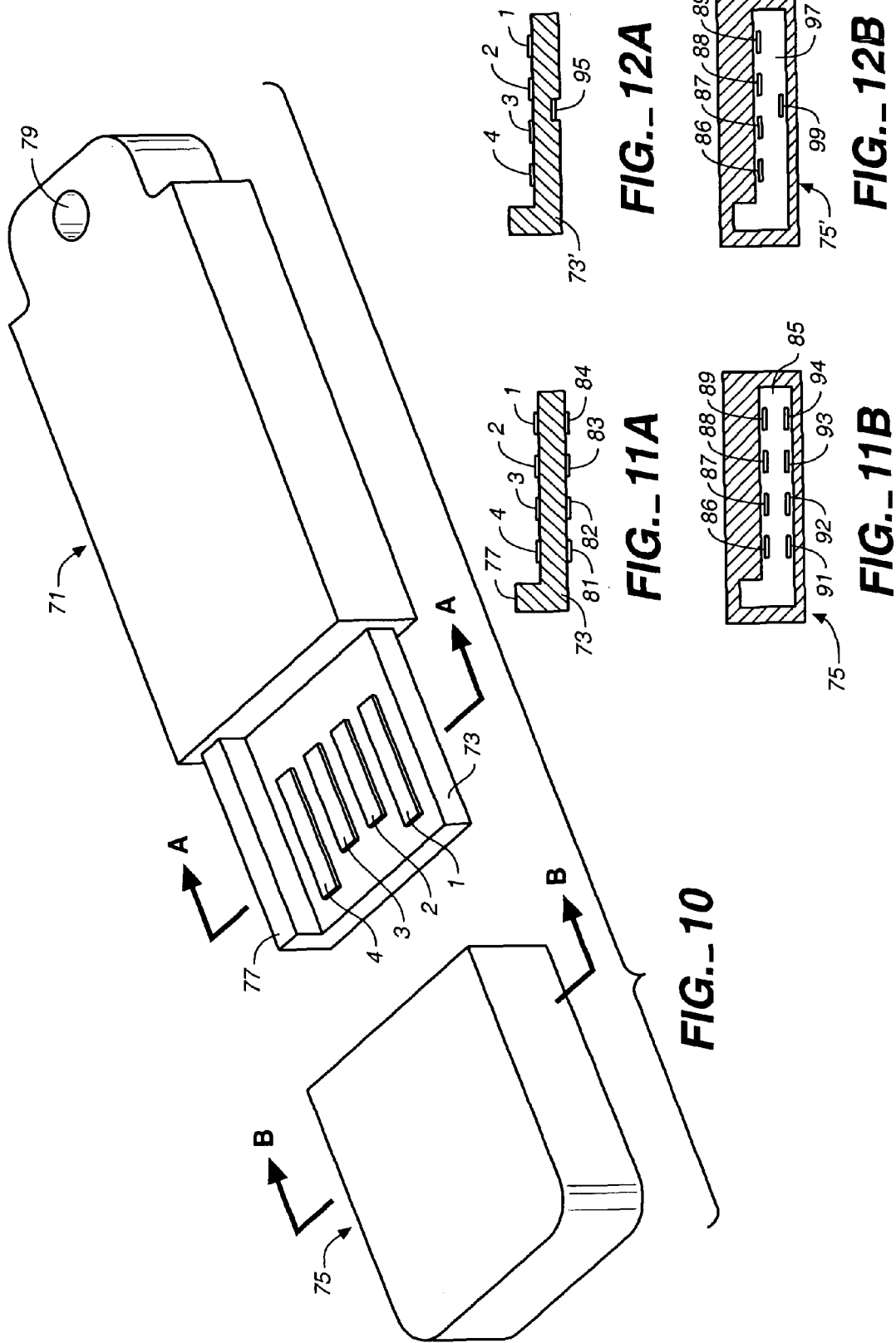

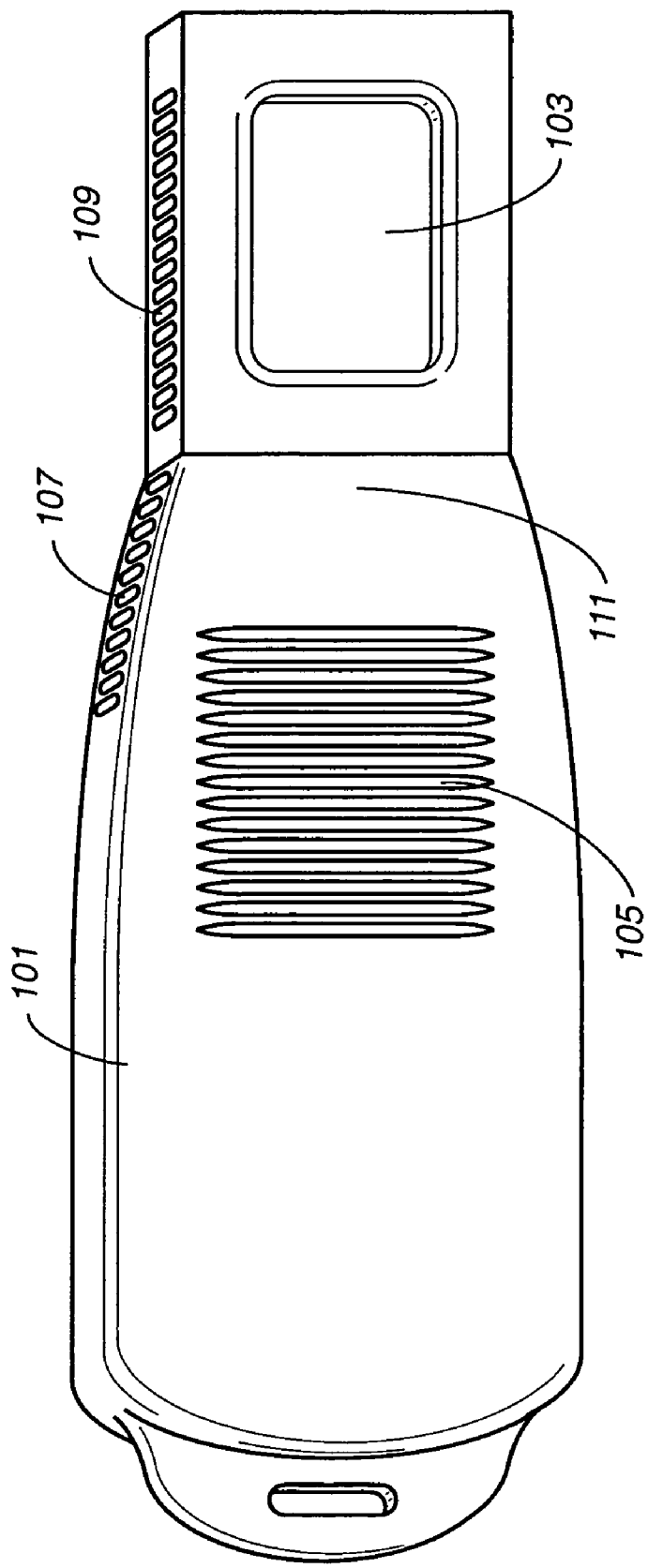
FIG._13

PORTABLE MEMORY DEVICES WITH REMOVABLE CAPS THAT EFFECT OPERATION OF THE DEVICES WHEN ATTACHED

BACKGROUND OF THE INVENTION

This invention relates generally to the structure and use of memory cards, flash drives and other small non-volatile memory devices.

Electronic circuit cards, including non-volatile memory cards, have been commercially implemented according to a number of well-known standards. Memory cards are used with personal computers, notebook computers, cellular telephones, personal digital assistants (PDAs), digital still cameras, digital movie cameras, portable audio players and other host electronic devices for the storage of large amounts of data. Such cards usually contain a re-programmable non-volatile semiconductor memory cell array along with a controller that controls operation of the memory cell array and interfaces with a host to which the card connected. Popular types of non-volatile memory cards include CompactFlash (CF), MultiMediaCard (MMC), Secure Digital (SD), miniSD, Memory Stick and TransFlash, each of which is sold by SanDisk Corporation, the assignee hereof.

Electrical contact patterns and types vary among the various memory cards. Several of the same type of card may be interchanged in a host card slot designed to accept that type of card but a receptacle designed for one type of card most often cannot accept any other type of card. Adaptors, both active and passive types, have been provided or proposed to allow some degree of interchangeability of electronic cards among such host devices. U.S. Pat. No. 6,266,724 of Harari et al. describes use of combinations of mother and daughter memory cards.

Other small, hand-held re-programmable non-volatile memory devices have also been made to interface with a computer or other type of host by including a Universal Serial Bus (USB) connector plug. These are especially convenient since personal computers, PDAs and other types of hosts commonly include one or more USB connector receptacles but may not have a receptacle slot that accepts any of above identified standard memory cards. Mechanical and electrical details of the USB connector and interface are provided by the "Universal Serial Bus Specification," revision 2.0, dated Apr. 27, 2000. There are several USB flash drive products commercially available from SanDisk Corporation under its trademark Cruzer. USB flash drives are typically larger and shaped differently than the memory cards described above.

Another, higher transfer rate interface that has become commonplace on personal computers and other host devices is specified by the following standard of the Institute of Electrical and Electronics Engineers (IEEE): "IEEE Standard for a High Performance Serial Bus," document no. IEEE 1394-1995, as amended by document nos. IEEE 1394a-2000 and IEEE 1394b-2002. A common commercial form of this bus interface is known as FireWire. Because of its higher speed, this interface is particularly useful for the transfer of large amounts of data to and from a host device.

A wireless communication capability has also been added to memory cards and flash drives in order to allow a notebook computer, PDA or other host device to use the card or flash drive for either wireless communication or non-volatile data storage, or both. These types of devices plug into the host in the same manner as the memory only device but provide the added capability of wireless communication of the host with other hosts, a Local Area Network (LAN), and the like. SanDisk Corporation manufactures combined memory and wireless communication devices as family of Wi-Fi Cards, for example.

SUMMARY OF THE INVENTION

The present invention relates primarily to re-programmable non-volatile memory devices as described above, and particularly to the use of caps or other portable attachments that electrically connect with the devices through their externally accessible electrical contacts when covering those contacts. Depending upon the function to be performed by the combination, the caps contain either passive or active elements that cooperate with the memory system to control, define, run, support, use or supplement the memory system in order to perform a desired function.

A first specific aspect of the present invention operates with memory devices that have two paths through which the memory may be accessed by a host for reading and programming data therein. One of the paths is through a set of external contacts according to an existing mechanical and electrical standard. The other path may be through a second set of such contacts according to another standard, through a wireless transceiver within the device, or through some other type of data input-output interface. A removable cap is held in place to cover the set of external contacts when they are not being used, and interacts with the device when so placed to enable or control operation of the device through the second data transfer path.

In one implementation, two or more caps are provided to control communication with the internal memory through the second path when placed over the external contacts of the first path. The two or more caps can control operation through the second path by mechanically, electrically or wirelessly sending different control signals to the device, depending upon which of the caps is placed over the first path conductors. An electrical connection is preferred, which may be made from the cap through the standard contacts of the first path, or through one or more additional contacts added to the standard connector, as examples. The different caps can be marked to visually distinguish them, such as making them different colors.

In a specific example, the second path is wireless and the range, frequency or other parameter of the wireless transmission is selected by placing one of two or more caps over the set of contacts of the first path to set the internal transmitter to operate over one of two or more different desired ranges. In this example, the internal wireless transceiver may be either passive, where the power to operate it is wirelessly induced into the device, or active, where battery power is provided within the device or in direct electrical connection with the device. Any battery may be either a rechargeable or a non-rechargeable type.

In another implementation, a cap is provided with an external manually actuated switch that allows the user to select one of two or more control signals sent by the cap to the memory device.

According to a second specific aspect of the present invention, a battery is included in the cap to power the device when the cap is positioned over externally accessible contacts of the device. When the device has two data transfer paths, the cap is attached to external contacts of the first path to operate the memory to transfer data through the second path. When the battery of a particular cap reaches its end of life, a new cap with a fresh battery is substituted. If rechargeable, the battery of a cap is recharged while removed from the device. The caps with batteries may also provide control of the data transfer through the second path, according to the first specific aspect of the present invention described above.

In a specific example that utilizes both of these specific aspects of the present invention, a selected cap is placed over a USB plug (the first path) to control the transmission range or frequency of an internal wireless transceiver (the second path), where a battery in the cap powers the transceiver. The memory is then wirelessly accessed for reading or programming data without having to connect the device with a host.

According to a third specific aspect of the present invention, the cap contains electronic circuits that are connected with the internal memory of the device through either its standard external contacts and/or additional contacts to form an overall system that performs a specific function. For instance, such a cap can convert the memory system into an audio player, or into a voice recorder. Such a cap may be used with a memory device having a second data path in addition to that provided by the set of external contacts, as described above, or with a memory device having the set of external contacts as its only data input-output path, depending upon the application.

Additional aspects, advantages and features of the present invention are included in the following description of exemplary examples thereof, which description should be taken in conjunction with the accompanying drawings. All patents, patent applications, specifications, articles and other publications referenced herein are hereby incorporated herein by these references in their entirety for all purposes.

BRIEF DESCRIPTION OF THE DRAWINGS

FIG. 1 shows a first example combination of a flash drive and a cap that incorporate various aspects of the present invention;

FIG. 2 is an electronic block diagram of a first embodiment of the flash drive of FIG. 1;

FIGS. 3A and 3B are circuit diagrams of alternate caps of FIG. 1 in a first embodiment that operate with the flash drive of FIG. 2;

FIGS. 4A and 4B are circuit diagrams of alternate caps of FIG. 1 in a variation of the first embodiment that operate with the flash drive of FIG. 2;

FIG. 5 shows a modified version of the cap of FIG. 1;

FIG. 6 is an electronic block diagram of a second embodiment of the flash drive of FIG. 1;

FIG. 7 is a circuit diagram of a cap of FIG. 1 in a second embodiment that operates with the flash drive of FIG. 5;

FIG. 8 is an electronic block diagram of a third embodiment of the flash drive of FIG. 1;

FIG. 9 is a circuit diagram of a cap of FIG. 1 in a third embodiment that operates with the flash drive of FIG. 7;

FIG. 10 shows a second example combination of a flash drive and a cap that incorporate various aspects of the present invention;

FIGS. 11A and 11B are cross-sectional views of the flash drive and cap of FIG. 10, taken at respective sections A-A and B-B thereof;

FIGS. 12A and 12B are cross-sectional views that show variations in those of FIGS. 11A and 11B, respectively; and FIG. 13 shows a third example combination of a flash drive and a cap that incorporate various aspects of the present invention.

DETAILED DESCRIPTION OF EXEMPLARY EMBODIMENTS

Referring initially to FIG. 1, an elongated flash drive 11 has an opening 13 at one end and a USB connector plug 15 at the other. In accordance with USB specifications, a metal shield 17 surrounds a dielectric layer 19 that includes four elongated contacts (not shown) on its surface. A gap exists between these contacts and the underside of the shield 17. A flash non-volatile memory system is present within the flash drive 11, receiving power to operate through two of the connector contacts and transferring data, commands and status information through the other two contacts. In a primary use, the USB plug 15 is inserted into a mating USB receptacle of a notebook computer, PDA, or other type of host system. The opening 13 is included for use by an individual to carry the flash drive with him or her on a key chain, necklace, or the like.

In addition to flash memory, the flash drive 11 includes a wireless transmitter and receiver (transceiver), through which data may be transferred between the internal flash memory and an external host or other system without contact or the necessity of a wired connection. Although the transceiver could operate in the infrared region of the electromagnetic spectrum, it is preferred that it operate with radio frequency energy such that the data path is neither directional nor limited to line of sight transmission. An antenna to both transmit and receive data may be positioned within the enclosure of the flash drive 11, as well as the transceiver to which it is connected. Alternatively, the antenna may be positioned on an outer surface of the flash drive 11.

A cap 21 fits over the USB connector plug 15 when the plug is not inserted into a receptacle of a host device. A cap is usually supplied with a flash drive in order to protect the plug when not in use. But the cap 21 herein may perform one or more additional functions. One function is to control operation of the wireless transceiver or other form of the second data path. Two or more different caps can be configured to set a parameter of the transceiver to two or more different values, for example, depending upon which cap is placed on the USB connector plug 15. The caps are preferably visually marked in some way to identify the value of the parameter that each cap will set when positioned over the plug 15, such as by making a portion or the entire external surface of the cap a unique color for each parameter value. One parameter of the internal wireless transceiver that is useful to control is its effective transmission distance. The use of one cap can, for example, allow the transceiver to transmit a very short distance, such as 10 meters or less, when privacy is a concern. When privacy is not a concern, another cap can be inserted on the plug 15 to allow transmission of data carrying signals beyond 10 meters. As an alternative to the use of multiple caps to select the flash drive function, a manually operable switch may be included on an outside surface of the cap 21 that is actuated by the user to select an operating parameter of the flash drive 11.

Another function that may be performed by the cap 21 is to supply power to the flash drive 11 through the two power contacts of the USB plug 15 in order to be able to operate the flash drive 11 wirelessly when not plugged into a host. A battery is preferably included within the cap 21 for this purpose. If the battery is non-rechargeable, the cap may be discarded when its battery becomes discharged and a new cap with a fresh battery then substituted for it. An alternative is to include a battery within the flash drive 11 that is either replaceable or rechargeable, but it is more convenient to place the battery in the removable cap 21. This feature may be provided alone or may be combined with the function selection feature described above.

Referring to FIG. 2, a block electronic diagram of the flash drive 11 is given that includes the ability for the cap 21 (FIG. 1) to control operation of the second data path. Inside the enclosure of the flash drive 11 are a flash memory cell array 25 and its controller 27, which are connected together by lines 29 for the transfer of data being programmed into or read from the memory, as well as to pass control and status signals. The controller 27 is provided with at least two communications ports. A first port 31 is connected through an interface circuit 33 to a plug 15' as a first data path between the memory 25 and outside of the flash drive 11. The plug 15' includes the standard four USB contacts as follows: 1 (VBUS, the positive voltage power input terminal), 2 (D−, one of the data contacts), 3 (D+, the second of the data contacts, and 4 (GND, the ground power input terminal). In addition, a fifth contact C is added to the standard USB plug in a manner that does not interfere with establishing connection with the four USB plug contacts. Although only a single additional contact C is shown, it may be advantageous in some embodiments to include two or more additional contacts through which control lines are connected between the flash drive 11 and cap 21. The plug 15' and USB interface 33 are made to operate with a host device, when the plug 15' is inserted into a USB receptacle of the host, in the same manner that flash drives currently operate to transfer data between the host and the flash drive memory.

A second port 35 of the controller 27 is connected with a radio frequency transceiver 37 that forms the second data path to and from the memory 25. An antenna 39 is included within the enclosure of the flash drive 11 or on one of its external surfaces. This provides a second path for receiving data to be programmed into the memory 25 and to transmit data read from the memory 25. This path wirelessly communicates data with a PDA, notebook computer or other host that includes a compatible wireless communication capability. This communication may be in accordance with any of several currently available wireless data communication protocols or others that may emerge in the future. This includes the Bluetooth wireless standard, the wireless fidelity (Wi-Fi) standard 802 of the Institute of Electrical and Electronic Engineers (IEEE), the more recent ultra-wideband (UWB) wireless technology, or wireless standards commonly used for radio frequency identity devices (RFID) or contactless smart cards such as the R.F. "Felica" standard used in Japan.

Control of the transceiver 37 of FIG. 2 from the added contact C of the plug 15' is provided through the controller 27, which identifies the type of cap currently attached by detecting an appropriate signal parameter in at least one line 40 that is connected to the at least one contact C. A line 41 from the controller 27 then carries a cap identifying signal to the transceiver 37. Any combination of the blocks of the system of FIG. 2 can be implemented in one or more integrated circuit chips. If the blocks are on separate chips, the line 40 could optionally be connected directly with the transceiver 37 as line 41 instead of first going to the controller 27. The transceiver 37 is constructed to respond to a control signal in the line 41 to select one of at least two modes of operation of the transceiver. In the present embodiment, one of two different ranges of transmission of signals through the antenna 39 is selected by this control signal, as discussed above. An example of a simple way to select between two operating modes is to either tie the line 40 to ground or not, through the connector 15'. This is accomplished within the cap 21 (FIG. 1).

An embodiment of the electrical connections within a pair of caps 21 that select the transceiver mode of operation are shown in FIGS. 3A and 3B. The cap 21 has a receptacle 45 according to the USB standard with a contact C' added in a position to connect with the contact C of the plug 15'. The receptacle 45 thereby physically and electrically mates with the plug 15' of the flash drive of FIG. 2. In the cap of FIG. 3A, a path between the added contact C' and the USB ground contact 4' is opened, while in the cap of FIG. 3B this electrical path is closed. When one of these caps is positioned on the flash drive plug 15', the control line 40 to the controller 27 is thus either open or grounded. The controller 27 translates this signal into the signal in the line 41 that controls the transceiver 37 to operate in one of its two pre-selected modes. Since only the contact 4 of the USB connector is used in this example, only the contacts 4' and C' need be included in the receptacle 45 but there is no harm in maintaining all four USB receptacle contacts.

Referring to FIGS. 4A and 4B, connections internal to a similar pair of caps 21 is illustrated. These caps each have a modified USB receptacle 47 and a battery 49 for supplying power to the flash drive on which the cap is placed. The battery 49 is connected between contacts 1' and 4', thus supplying power to the USB standard contacts 1 and 4 of the plug 15' of FIG. 2. The cap of FIG. 4A, like that of FIG. 3A, has an opened path between contacts C' and 4', while that connection is closed in the cap of FIG. 4B. When one of the caps of FIGS. 4A and 4B is attached to the flash drive of FIG. 2, the flash drive becomes operable to transfer data to and from the memory 25 through the transceiver 37, which operates in a manner specified by the selected cap.

This operation takes place without having to connect the flash drive with a host device since it has its own source of power. An advantage of placing the battery in the cap, instead of in the flash drive itself, is that replacement of the battery is simplified. When the battery becomes low or goes dead, the cap is replaced. If the battery is rechargeable, the cap is connected with a charger and then used again when recharged. If the battery is non-rechargeable, the cap is discarded in favor of the new cap with a fresh battery.

The open or grounded conditions provided by the pair of caps of either of FIGS. 3A-B or 4A-B can alternatively be accomplished by the use of a single cap that has a mechanical two-position switch on an outside surface thereof. Such a cap 21' is illustrated in FIG. 5. A switch 23 is positioned on its end. Of course, if a selection is to be made between more than two operating parameters of the flash drive 11, the switch will have more than two positions.

One modification of the system of FIGS. 2-4 that may be useful for particular applications is to limit or change the transceiver 37 to generally be able to transmit data from the memory 25 through the antenna 39 but which without the ability to wirelessly receive commands and/or write data into the memory. For example, the system could be configured to send a single transmission of specified data in response to the cap being placed on the device connector, and then switch into a sleep mode in order to save power.

A block circuit diagram of FIG. 6 shows a modified version of the flash drive of FIG. 2, and FIG. 7 shows a circuit diagram of a mating cap. In this example, the standard USB plug 15 is utilized on the flash drive and a mating USB receptacle 53 on the cap. The battery 49 is included in the cap and connected with the USB connector power contacts 1 and 4. The difference in this configuration from the embodiment of FIGS. 2-4 is the use of a circuit 55 within the cap to generate a signal that designates the mode of operation of the transceiver 37. This signal is communicated through the USB data contacts 2 and 3 and the USB interface circuits 33 to the controller 27'. No extra contact or contacts need be added to the standard USB connector. When the cap of FIG. 7 is attached to the USB connector 15 of the flash drive of FIG. 6, the controller decodes the signal output of the circuit 55 and generates the control signal in line 41' to set the operating mode of the transceiver 37. The circuit 55 is powered within the cap by connection across the battery 49. Multiple caps may be provided whose circuits 55 generate respective two or more control signals at the connector pins 2' and 4', or a single cap may be used that has an external switch controlling operation of the circuits 55 to select the signal generated.

One application of any of the combinations described with respect to FIGS. 2-7 is as a military "dog tag" that is worn by military personnel. Medical and other personal information of the wearer is stored in the non-volatile memory 25. The cap that controls the transceiver to transmit over the shorter range would normally be placed on the flash drive, since it is undesirable for anyone but a medic or doctor in close proximity to the wearer to be able to access his or her medical records. This would be replaced with a cap that switches the transmitter to operate over an extended range when the wearer is in a secure location such as military offices, a hospital and the like, or where the user desires to wirelessly synchronize and update his or her files when in the vicinity of a wireless network for the wireless protocol being used, such as a Wi-Fi "hot spot". The data stored in the non-volatile memory can be updated through the USB connector plug when inserted into a standard USB receptacle of a computer or other host device, or through a wireless hot spot connected to a central server.

A common concept of the cap and flash drive examples of FIGS. 2-7 is that a mode of operation of a portable memory system (flash drive, memory card, and the like) is controlled by a cap that is placed on a connector forming one of two data transfer paths. This is not limited to controlling a characteristic of the second data transfer path, and, when the second path is being controlled, not limited to controlling a wireless transceiver of that path. This second data path can be, for example, another set of contacts, usually according to a different physical and/or electrical standard than the set of contacts that accepts the cap. Further, when controlling a wireless transceiver, a characteristic different from the transmission range can be set by the cap, such as its transmission and/or reception frequency. Also, although a simple binary wire connection is shown for selecting the operating mode in FIGS. 2-4, other passive circuits can be substituted to generate a controlling signal, such as by providing different levels of resistance or capacitance. One of more than two operating modes can then be controlled. The example of FIGS. 6 and 7 also allows controlling more than two modes by the active signal generating circuit 55. And although the connector is described to follow the USB standard, a connector following another standard can be used instead, such as a Firewire connector or one of the many standard non-volatile memory cards.

Supplying power to the flash drive by a battery in the cap can also be utilized independently of using the cap to control operation of the memory system. For example, even if there is only one operating mode of the transceiver, the battery cap is a convenient way of allowing its operation without having to be connected through the USB connector to a host to obtain power. An example of this is illustrated by FIGS. 8 and 9, where a generic interface 61 is connected between the second port 35 of the controller and input/output circuits 63. The cap of FIG. 9 includes the battery 49 connected with the pins 1' and 4' of a USB receptacle 65. Placement of the USB plug 15 of the memory system of FIG. 8 into the USB receptacle 65 of the cap of FIG. 9 provides operating power to the memory system for transferring data between the memory 25 and input/output circuits 63.

The circuits 63 may be terminated in a connector that follows some published standard. Examples of memory cards that include both a USB plug, with which the USB cap may be used, and a pattern of contacts according to another published card standard are given in two pending U.S. patent application Ser. Nos. 10/826,801, now publication no. 2005/0230484 A1, and 10/826,796, now publication no. 2005/0230483 A1, both filed Apr. 16, 2004. The battery within the cap is then connected to the power input contacts 1 and 4 of the USB connector plug while the data contacts 2 and 3 remain unconnected with anything in the cap. The pattern of contacts may be according to the Secure Digital (SD) specifications with signals according to an SD input-output (SDIO) standard.

As a further alternative, the cap may contain an integrated circuit chip or chips connected with the memory in the card or flash drive to which it is attached, through the USB data contacts 2 and 3, in order to form a special purpose electronic system. Such circuits are powered from the battery in the cap. This may be done for memory cards and flash drives having a single input-output data path or those having a wireless transceiver or other type of second data path. For example, the cap may include a global positioning system (GPS) that utilizes the memory in the mating card or flash drive to store coordinate data of locations in which the device has been positioned. One application of such a GPS system is for a person carrying the device to walk along a path whose coordinates are being measured, those coordinates being recorded in the non-volatile memory for later use.

Another example of a special purpose system is a voice recorder, where the cap includes a microphone, an analog-to-digital converter circuit and associated supporting components. The non-volatile memory then records data of sound picked up by the microphone. Yet another system example is an audio player, where the cap contains circuitry to play back audio data stored in the non-volatile memory and an earphone plug. Further, the cap may contain an intelligent microprocessor system on one or more integrated circuit chips that may serve as a master in a computing system where the flash drive serves as a storage device, including controlling the transfer of data through a second data transmission path when the second path is present. These and other electronic systems may be formed with any of the memory card and flash drive examples described herein. Providing the electronic system in such a small cap as described herein has many advantages. Such electronic systems become even more useful when the wireless communications capability described above is included the flash drive to which the cap is attached.

In FIG. 10, a flash drive 71 is shown to have a USB connector plug dielectric substrate 73 that carries the contacts 1-4 of the USB standard. The metal shield of the standard USB plug is omitted from this version in order to be able to reduce the dimensions of the flash drive, primarily its thickness. The mechanical strength of the flash drive may be maintained without the metal shield, for example, by molding the plug substrate 73 and the rest of the flash drive enclosure as a single unit. A ridge 77 may also be molded as part of the flash drive to act as a positioning key when being plugged into a standard USB receptacle or into a receptacle of a mating cap 75. The flash drive 71, with or without the cap 75 in place on it, may be carried on a key chain, neck chain or the like, when extending though a hole 79 at an opposite end of the flash drive 71.

The substrate 73 carries one or more contacts in addition to those of the USB connector, such as the contact C of FIG. 2, on its underside. This is shown in the sectional view of FIG. 11A, where four such contacts 81-84 are illustrated but any number may be employed from one to a maximum limited by the available space. This allows control by the cap 75 of some function within the flash drive 71, such as the transmission range of a radio transceiver discussed earlier. The extra contacts also allow formation of an operable system from a combination of any integrated circuits within the cap 75 and circuits of the flash drive 71, when the two are connected together.

As shown in the sectional view of FIG. 11B, the cap 75 contains a mating receptacle 85 has resilient and compressible contact fingers 86-89 arranged in the same pattern as the USB plug contacts 1-4, and which then individually urge against one of those contacts when the cap 75 is positioned over the plug 73. Similarly, contact fingers 91-94 are attached to an opposite wall of the receptacle 85, which urge against surface contacts 81-84, respectively, when the plug 73 placed into the receptacle 10B.

When the plug 73 is inserted into a standard USB receptacle of a PDA or other host device, the added contacts 81-84 may touch a metal inside surface of the receptacle. Depending upon what these extra contacts are connected to within the flash drive 71, this could be undesirable since the extra contacts may thereby electrically connect with each other and/or to the potential of the metal they touch. Therefore, in order to prevent the potential of such touching, the extra contacts can be positioned in grooves in the underside of substrate 73. A single such groove and contact 95 are shown in the variation of FIG. 12A. A receptacle 97 within the cap 75 therefore includes a single resilient contact finger 99 positioned to urge against the contact 95 when the connector substrate 73' is inserted into the receptacle 97.

When referring herein to connector standards, it will be recognized that there are both mechanical arrangement and electrical signal protocol aspects to the standards. There are applications where a connector follows both aspects of a standard but additionally carries signals that do not follow the electrical signal protocol of the standard, or others where another signal protocol is substituted for that of the standard. The other signal protocol may be selected on the basis that it is better for a particular application. That of course requires that the device to which the connector will attach also operate with the different protocol.

One use of an additional signal protocol is to operate over the USB bus between the flash drive and electronic circuits in an attached cap by a signal protocol that is different than the USB protocol but which also maintains the ability of the flash drive to operate with the USB signal protocol when the flash drive is used with the other devices that require it. For example, it is desirable to operate the circuits when powered by a battery with a voltage that is less than the five-volt standard of the USB bus specifications, or at a lower data transfer rate. The purpose is to save battery energy, which is very important for many applications of the devices described above.

Referring to FIG. 13, a flash drive 101 and an attached cap 103 are shown. The flash drive and cap have different shapes than those of FIGS. 1 and 10. The cap 103 is positioned over the drive's USB connector plug (not shown). For easy handling while moving the cap 103 on and off the flash drive 101, roughened surface areas 105, 107 and 109 are provided. The thumb or forefinger of a user, either on the left or right hand, may grip either of the areas 105 or 107 of the flash drive while the cap is removed from or placed onto the flash drive. The roughened surface area 109 of the cap may be gripped by a thumb or forefinger of the other hand when doing so. A downward slope of the area of the flash drive 101 containing the roughened area 107 makes it easier to hold the flash drive with one hand when pulling off the cap 103 with the other hand. A depression 111 may also be provided in the flash drive immediately adjacent the cap 103 as a thumb grip. The flash drive 101 and cap 103 of FIG. 13 preferably have thicknesses of 8 millimeters or less. The flash drive may also have a detent (not shown) to affect a clicking sound when the cap is properly in place.

The caps 21 (FIG. 1), 21' (FIG. 5), 75 (FIG. 10) and 103 (FIG. 13) each is preferably made small relative to the respective flash drives 11, 11, 71 and 101 on which they are removably placed. For flash drives having a rectilinear shape, one or both of the cross-sectional dimensions of width and thickness are made to be the same as or less than that of the flash drive, such as at surfaces against which the caps abut when attached to the flash drives. The length of a cap is preferably made to be less than the entire length of the flash drive to which it attaches. A cap may be larger than the flash drive in one, two or all of the three dimensions but the smaller cap is preferred. Whatever the specific relative dimensions, it is the overall size of the cap that is preferably made smaller than the flash drive to which it attaches. The overall sizes of the cap and flash drive may be measured by their volumes within their outside surfaces, including spaces within the cap receptacle and flash drive plug. The volume of the cap is preferably made to be less than the volume of the flash drive to which it is adapted to attach.

Although the various aspects of the present invention have been described with respect to exemplary embodiments thereof, it will be understood that the present invention is entitled to protection within the full scope of the appended claims.

It is claimed:

1. An electronic system, comprising:
   a re-programmable non-volatile memory system within an enclosure, said memory being accessible through at least first and second data transmission paths,
   wherein the first data transmission path includes a set of external contacts,
   at least first and second caps that are alternately attachable over the set of external contacts and are visually distinct from each other, wherein
      the first cap includes a control path that sets a parameter of the second data transmission path to a first value when the first cap is attached over the set of externally accessible contacts, and
      the second cap includes a control path that sets the parameter of the second data transmission path to a second value different from the first value when the second cap is attached over the set of externally accessible contacts.

2. The system of claim 1, wherein the second data transmission path includes a wireless transceiver.

3. The system of claim 2, wherein the first and second parameters include different distances of transmission by the transceiver.

4. The system of claim 3, wherein the transceiver operates with radio frequency energy, the first transmission range is less than about ten meters and the second transmission range is greater than about ten meters.

5. The system of claim 2, wherein the first and second parameters include different frequencies of transmission by the transceiver.

6. The system of claim 2, wherein each of the first and second caps additionally includes a battery connectable with the external contacts when positioned thereover to provide power to the memory and transceiver.

7. The system of claim 1, wherein each of the first and second caps additionally includes a battery connectable with the external contacts when positioned thereover to provide power to access the memory through the second data path.

8. The system of claim 7, wherein the battery is rechargeable.

9. The system of claim 1, wherein the second data path includes a second set of external contacts.

10. The system of claim 9, wherein the second set of external contacts physically follows the SD card standard.

11. The system of claim 1, wherein the control path of the first cap includes a short circuit between an electrical contact added to the set of external contacts and one of the external contacts, and wherein the control path of the second cap includes an open circuit between the added electrical contact and said one of the external contacts.

12. The system of claim 1, wherein the control paths of the first and second caps are made only through said set of external contacts.

13. The system of claim 1, wherein the first and second caps have different colors to make them visually distinct from each other.

14. The system of claim 1, wherein the set of external contacts has a physical arrangement in accord with the published USB standard.

15. An electronic system, comprising:
a re-programmable non-volatile memory system within an enclosure, said memory being accessible through at least first and second data transmission paths, the first data transmission path including a set of external contacts,
at least one cap removably attachable to the enclosure over the set of external contacts and communicating with the memory system therethrough, and
a manually actuatable switch, positioned on an outside surface of the cap, that communicates a signal through the set of memory system external contacts for controlling a parameter of the second data transmission path according to a mechanical position of the switch.

16. The system of claim 15, wherein the second data transmission path includes a wireless transceiver.

17. The system of claim 16, wherein the controlled parameter includes different distances of transmission by the transceiver.

18. The system of claim 17, wherein the transceiver operates with radio frequency energy, and the controlled parameter includes a transmission range less than about ten meters and a transmission range of more than about ten meters.

19. The system of claim 16, wherein the controlled parameter includes different frequencies of transmission by the transceiver.

20. The system of claim 15, wherein the cap additionally includes a battery connectable with the external contacts when positioned thereover to provide power to at least enable operation of the memory system through the second data transmission path.

21. The system of claim 20, wherein the battery is rechargeable.

22. The system of claim 15, wherein the second data path includes a second set of external contacts.

23. An electronic system, comprising:
a re-programmable non-volatile memory positioned within an enclosure, data being transferable with the memory through either of at least two data transmission paths,
a wireless transceiver carried by the enclosure and connected with the memory to provide one of the at least two data transmission paths, said transceiver being operable with at least first and second controllable characteristics including at least one of a range or frequency of transmission of the transceiver,
a set of external contacts compatible with a USB standard positioned for access from outside the enclosure and connected with the memory to provide the other of the at least two data transmission paths,
at least first and second caps that are alternately attachable to the enclosure over the set of external contacts, wherein
the first cap includes a control path with the wireless transceiver to cause it to operate with the first characteristic, and
the second cap includes a control path with the wireless transceiver to cause it to operate with the second characteristic.

24. The system of claim 23, wherein the first and second caps are visually distinct from each other.

25. The system of claim 23, wherein each of the first and second caps additionally includes a battery connectable with the external contacts when positioned thereon to provide power to the memory and transceiver.

26. The system of claim 25, wherein the battery is rechargeable.

27. The system of claim 23, wherein the transceiver operates with radio frequency energy, the first characteristic includes a transmission range of the transceiver that is less than about ten meters and the second characteristic includes a transmission range of the transceiver that is greater than about ten meters.

28. The system of claim 23, wherein the control path of the first cap includes a short circuit between an electrical contact added to the set of external contacts and one of the external contacts, and wherein the control path of the second cap includes an open circuit between the added electrical contact and said one of the external contacts.

29. The system of claim 23, wherein the control paths of the first and second caps are made only through said set of external contacts compatible with the USB standard.

30. The system of claim 23, wherein the first and second caps have different colors that make them visually distinct from each other.

31. An electronic system, comprising:
a re-programmable non-volatile memory positioned within an enclosure, data being transferable with the memory through either of at least two data transmission paths,
a wireless transceiver carried by the enclosure and connected with the memory to provide one of the at least two data transmission paths, said transceiver being operable with at least first and second controllable characteristics including at least one of a range or frequency of transmission of the transceiver,
a set of external contacts compatible with a USB standard positioned for access from outside the enclosure and connected with the memory to provide the other of the at least two data transmission paths,
at least one cap removably attachable to the enclosure over the set of external contacts and communicating with at least the transceiver therethrough, and
a manually actuatable switch, positioned on an outside surface of the cap, that communicates a signal through the set of external contacts that selects among at least the first and second controllable characteristics.

32. The system of claim 31, wherein each of the first and second caps additionally includes a battery connectable with the external contacts when positioned thereon to provide power to the memory and transceiver.

33. The system of claim 32, wherein the battery is rechargeable.

34. The system of claim 31, wherein the transceiver operates with radio frequency energy, the first characteristic includes a transmission range of the transceiver that is less than about ten meters and the second characteristic includes a transmission range of the transceiver that is greater than about ten meters.

35. An electronic system, comprising:
a re-programmable non-volatile memory system within an enclosure, said memory being accessible through at least first and second data transmission paths,
a set of external contacts included in the first data transmission path and outside the enclosure, a cap that is removably attachable over the set of external contacts, and a battery within the cap and connected to provide power to the memory system through the external contacts when the cap is attached thereover, thereby to make the memory system operable for data transfer through the second data transmission path, additionally comprising a computing system within the cap that controls through the set of external contacts the non-volatile memory system and data transfer through the second data transmission path.

36. The system of claim 35, wherein the battery is rechargeable.

37. The system of claim 35, wherein the cap and battery are disposable after the battery becomes discharged.

38. The system of claim 35 wherein the second data transmission path includes a wireless transceiver.

39. An electronic system, comprising: a re-programmable non-volatile memory system within an enclosure, a set of externally accessible contacts connected with the memory system and outside the enclosure, a cap that is removably attachable to the set of external contacts, the cap occupying a volume that is less than a volume within said enclosure, and a battery within the cap and connected to provide power to the memory system through the externally accessible contacts when the cap is attached thereto, whereby the memory system may operate without being connected with a host system, wherein the cap additionally includes a circuit connectable with the memory system through the externally accessible contacts to control at least one operating parameter of the memory system.

40. The electronic system of claim 39, wherein the cap additionally includes electronic circuits connectable with the memory system through the externally accessible contacts that combine together to form an overall system using the memory system but which performs a function that the memory system cannot perform alone.

* * * * *